US010678855B2

(12) United States Patent
Vaughn et al.

(10) Patent No.: US 10,678,855 B2
(45) Date of Patent: Jun. 9, 2020

(54) GENERATING DESCRIPTIVE TEXT CONTEMPORANEOUS TO VISUAL MEDIA

(71) Applicant: International Business Machines Corporation, Armonk, NY (US)

(72) Inventors: Garfield Vaughn, South Windsor, CT (US); Aaron K. Baughman, Silver Spring, MD (US); Julija Narodicka, Brno (CZ); Moncef Benboubakeur, Brno (CZ); Diwesh Pandey, Jeevan Bhima Nagar (IN)

(73) Assignee: International Business Machines Corporation, Armonk, NY (US)

(*) Notice: Subject to any disclaimer, the term of this patent is extended or adjusted under 35 U.S.C. 154(b) by 54 days.

(21) Appl. No.: 15/958,423

(22) Filed: Apr. 20, 2018

(65) Prior Publication Data
US 2019/0325067 A1 Oct. 24, 2019

(51) Int. Cl.
G06F 17/00 (2019.01)
G06F 16/783 (2019.01)
G10L 15/26 (2006.01)
G06N 20/00 (2019.01)
G06F 16/335 (2019.01)
G06F 16/683 (2019.01)

(52) U.S. Cl.
CPC ........ G06F 16/7844 (2019.01); G06F 16/337 (2019.01); G06F 16/685 (2019.01); G06N 20/00 (2019.01); G10L 15/26 (2013.01)

(58) Field of Classification Search
CPC ...... G06F 17/289; H04N 9/8233; H04L 67/22
USPC ........ 715/202, 265, 745, 204, 254, 260, 264
See application file for complete search history.

(56) References Cited

U.S. PATENT DOCUMENTS 7,242,988 B1    7/2007  Hoffberg et al.
8,266,313 B2 *  9/2012  Pettinato ................. G06F 9/542
                                                       709/207

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

Primary Examiner — Stephen S Hong
Assistant Examiner — Matthew J Ludwig
(74) Attorney, Agent, or Firm — Heslin Rothenberg Farley & Mesiti P.C.; Scott Dobson, Esq.

(57) ABSTRACT

A method, computer program product, and a system where a processor(s) determines that a processing device of the first computing node is transmitting media content to a user interface of the first computing node, including audio content. The processor(s) progressively obtains, contemporaneous with the transmitting, a textual representation of the audio content. The processor(s) modifies the textual representation of the audio content by utilizing elements of a user profile of the user of the first computing node to identify and modify textual elements of the textual representation of the audio content in accordance with the specific changes. The processor(s) renders the modified textual representation in the user interface, wherein each portion of the textual representation is synchronized to render when a corresponding portion of the audio content is played in the user interface.

20 Claims, 7 Drawing Sheets

(56) References Cited

U.S. PATENT DOCUMENTS

| | | | |
|---|---|---|---|
| 9,013,671 B2* | 4/2015 | Huber | G03B 21/00 |
| | | | 352/40 |
| 9,571,870 B1* | 2/2017 | Wilson | H04N 21/4722 |
| 9,680,945 B1 | 6/2017 | Treves et al. | |
| 9,710,553 B2* | 7/2017 | Harrenstien | G06F 16/95 |
| 9,870,357 B2* | 1/2018 | Cohen | G06F 17/289 |
| 10,051,239 B2* | 8/2018 | Stanford-Clark | |
| | | | H04N 7/17318 |
| 2005/0108026 A1 | 5/2005 | Brierre et al. | |
| 2012/0316860 A1 | 12/2012 | Reitan | |
| 2013/0091429 A1 | 4/2013 | Weng et al. | |

OTHER PUBLICATIONS

Richard Gray, "Never Struggle to Read subtitles Again! smaung Patnts Eye-Tracking Technology to Zoom in if it Sees You Squinting at the TV", Mailonline, published Aug. 27, 2015, 34 pages.

Elvira Popescu, "Dynamic Adaptive Hypermedia Systems for E-Learning", Universite de Technologie de Compiegne, 2008, HAL Id: tel-00343460, https://tel.archives-ouvertes.fr/tel-00343460.

* cited by examiner

GENERATING DESCRIPTIVE TEXT CONTEMPORANEOUS TO VISUAL MEDIA

BACKGROUND

Some personal and environmental conditions make it hard to understand the content of media watched because the sound is not audible. In the absence of sound or reliable sound, media providers, including media sources and devices that display the media provided by the sources, may utilize one or more of subtitles and captions. Subtitles refer to textual representations of what is spoken by a character/entity viewable on a device in the media. Captions refer to textual representations of objects and how the objects interact within an environment in the media, rendered by the device. For example, while a subtitle may provide text on a graphical user interface that includes the words spoken by a character, contemporaneously with the character's speech, captions reflect noises, such as a crashing noise when a character visible in the interface knocks over an object, such as a lamp, on the screen. Another caption may describe the journey of the lamp from the table to the floor. Textual representations of audio content, including both subtitles and captions, are useful to individuals viewing media on personal computing devices (e.g., in loud environments, when the sound can be difficult to decipher), watching content in a public setting, where the volume settings are not in the control of the individual (e.g., watching a movie in a cinema), viewing content with audio in a language that they do not speak, and participating in an online course. Current approaches to providing audio content, textually, involve providing a generic audio to textual translation of words and actions, as represented by subtitles and captions. However, present solutions to providing textual content in place of or to supplement audio content are largely a one-size-fits-all approach, meaning that the same content is provided to all users experiencing the media.

SUMMARY

Shortcomings of the prior art are overcome and additional advantages are provided through the provision of a method for generating customized content to supplement audio in media. The method includes, for instance: determining, by one or more processors, that a processing device of the first computing node is transmitting media content to a user interface of the first computing node, wherein the media content includes audio content; progressively obtaining, by the one or more processors, contemporaneous with the transmitting, a textual representation of the audio content; progressively modifying, by the one or more processors, the textual representation of the audio content, wherein the progressively modifying comprises: identifying, by the one or more processors, a user of the first computing device; based on the identifying, generating, by the one or more processors, a user profile for the user, the generating comprising: monitoring, by the one or more processors, user activity on the first computing node to identify structured and unstructured data sources storing data related to the user, wherein the activity on the first computing node comprises connecting to the structured and unstructured data sources; machine learning, by the one or more processors, personal attributes of the user, based on ingesting structured data and unstructured data from the data sources; determining, by the one or more processors, that a portion of the attributes represent elements that correlate with specific changes to textual content; and generating, by the one or more processors, the user profile comprising the elements; and utilizing, by the one or more processors, the elements of the user profile of the user of the first computing node to identify and modify textual elements of the textual representation of the audio content in accordance with the specific changes; and rendering, by the one or more processors, the modified textual representation in the user interface, wherein each portion of the textual representation is synchronized to render when a corresponding portion of the audio content is played in the user interface.

Shortcomings of the prior art are overcome and additional advantages are provided through the provision of a computer program product for generating customized content to supplement audio in media. The computer program product comprises a storage medium readable by a processing circuit and storing instructions for execution by the processing circuit for performing a method. The method includes, for instance: determining, by the one or more processors, that a processing device of the first computing node is transmitting media content to a user interface of the first computing node, wherein the media content includes audio content; progressively obtaining, by the one or more processors, contemporaneous with the transmitting, a textual representation of the audio content; progressively modifying, by the one or more processors, the textual representation of the audio content, wherein the progressively modifying comprises: identifying, by the one or more processors, a user of the first computing device; based on the identifying, generating, by the one or more processors, a user profile for the user, the generating comprising: monitoring, by the one or more processors, user activity on the first computing node to identify structured and unstructured data sources storing data related to the user, wherein the activity on the first computing node comprises connecting to the structured and unstructured data sources; machine learning, by the one or more processors, personal attributes of the user, based on ingesting structured data and unstructured data from the data sources; determining, by the one or more processors, that a portion of the attributes represent elements that correlate with specific changes to textual content; and generating, by the one or more processors, the user profile comprising the elements; and utilizing, by the one or more processors, the elements of the user profile of the user of the first computing node to identify and modify textual elements of the textual representation of the audio content in accordance with the specific changes; and rendering, by the one or more processors, the modified textual representation in the user interface, wherein each portion of the textual representation is synchronized to render when a corresponding portion of the audio content is played in the user interface.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
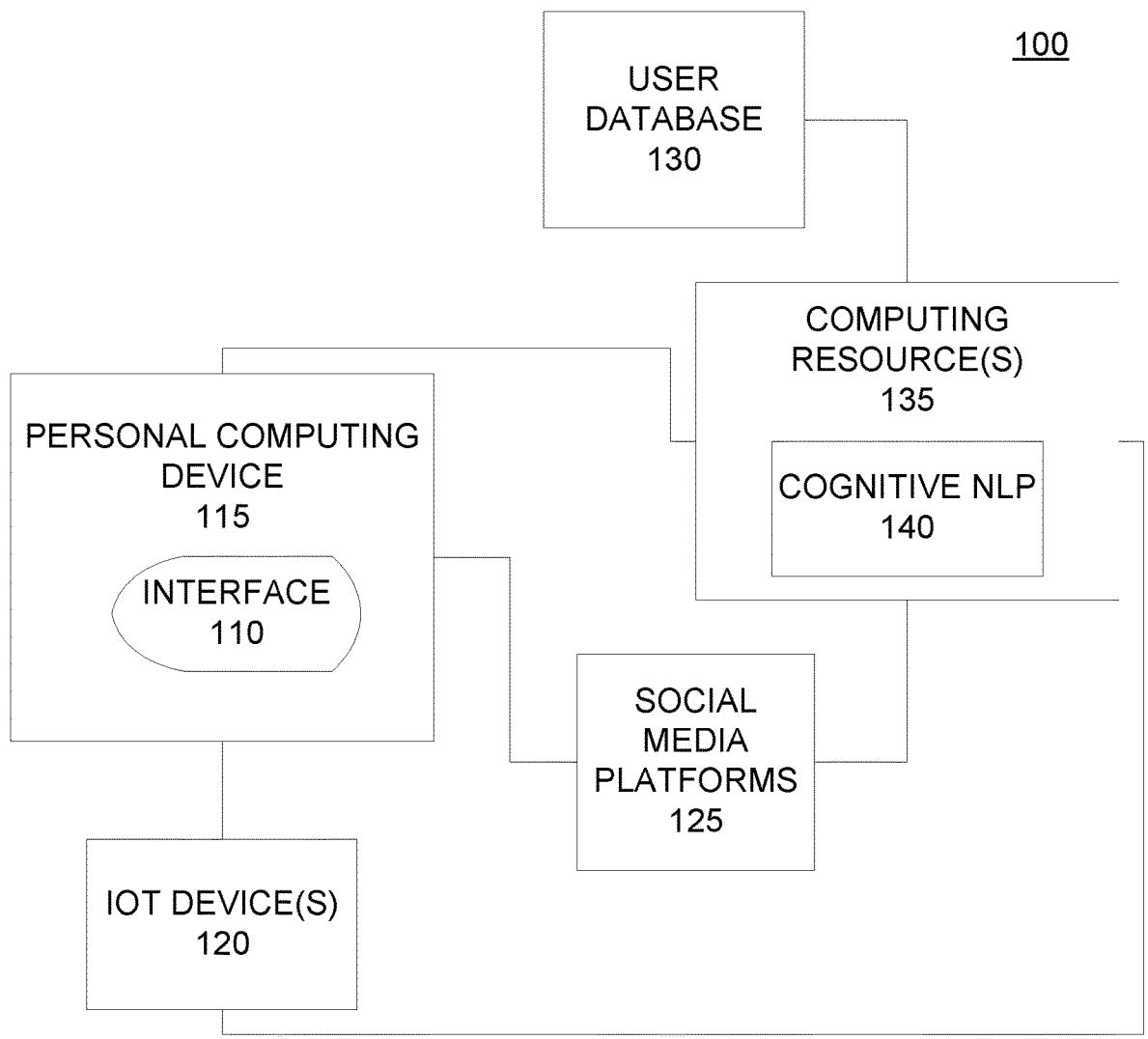
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
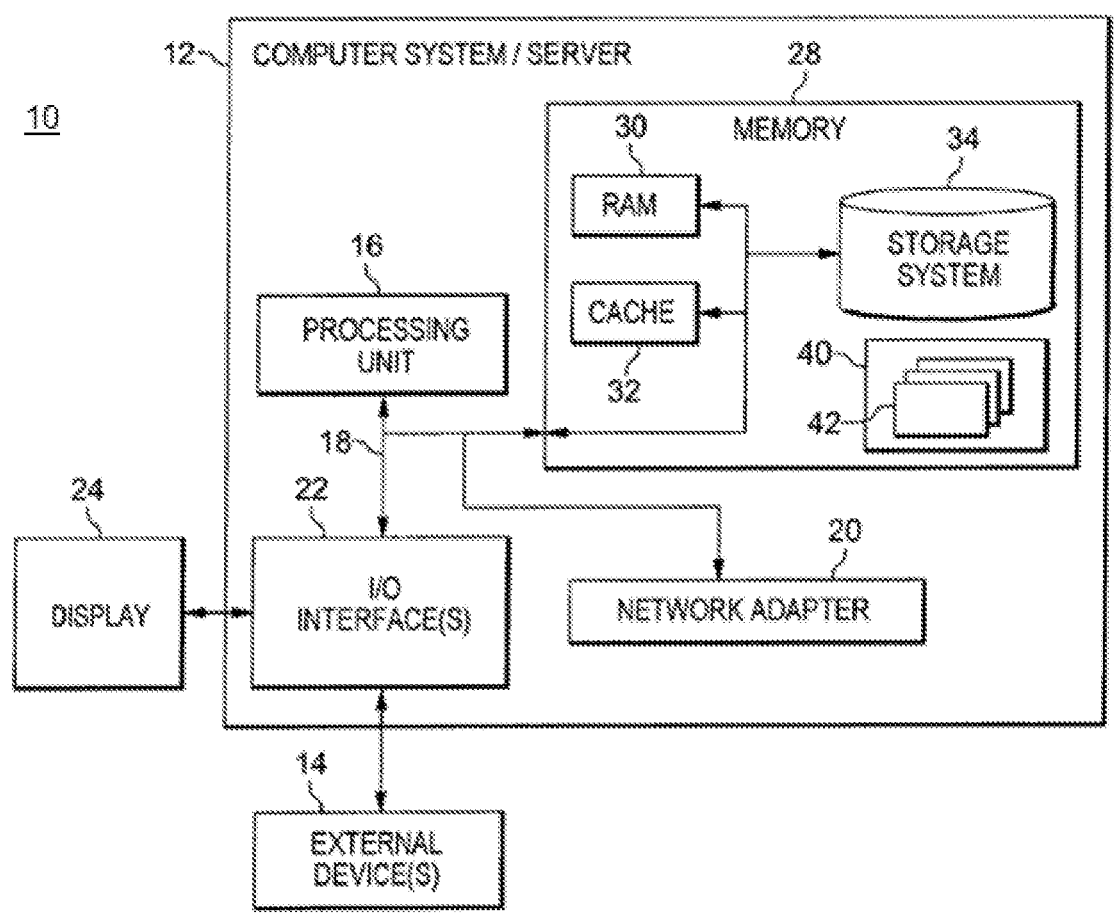
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computer system that include program code executed on at least one processing circuit that generates or augments textual representations of audio in visual media, including but not limited to, subtitles and captions. In embodiments of the present invention, the program code identifies the user/viewer of the media and provides the textual representations based on identifying the user and utilizing data sources available on a distributed network to personalize the content generated. In some embodiments of the present invention, the program code: 1) obtains visual media that includes audio (e.g., a digital video); 2) determines initial text for the audio of the media (e.g., generates using speech-to-text software, obtains one or more text files with the video); and 3) updates the initial text to generate personalized text for the audio of the media.

In some embodiments of the present invention, the program code updates the initial text utilizing a self-learning user profile, which the program code maintains and continuously revises. The ability of the program code to establish the profile, in embodiments of the present invention, relies upon the ability of the program code to leverage the interconnectivity of various systems and devices over a distributed network. The distributed network may include various nodes of a cloud computing system. For example, in embodiments of the present invention, the program code generates the profile based on data relevant to the user that the program code extracts from sources including, but not limited to, social media profiles and Internet of Things (IoT) devices, including personal IoT devices (e.g., smart watches, personal fitness monitors, smart home systems, health monitoring systems, augmented reality viewer, etc.). In embodiments of the present invention, the program code generates the self-learning user profile by training machine learning algorithms (executed by a computing system) using various types of training data sets that represent various parameters that may impact a user profile and how to update textual content to be personalized to this user. Data utilized to train the algorithms which the program code utilized to generate a user profile may include parameters related to the user such as lexicon (vocabulary, language, or branch of knowledge), culture, age, religion, somatic state (as captured by one or more IoT devices associated with the user). The program code can effectively input the initial text and based on applying the user profile, as generated through machine learning, obtain a personalized augmented text as an output. The personalized/customized text generated by the program code in embodiments of the invention may include one or more of: subtitle text and caption definitions. Caption definitions represent how objects move, sound, or appear to the user (viewer). The one or more programs may be executed on various nodes of a distributed computing system, including but not limited to, a cloud computing system. Additionally, the data sources identified may also be computing nodes of a distributed computing system, including but not limited to, a cloud computing system.

Embodiments of the present invention include one or more programs executed on a processing circuit that ingest, compute and (machine) learn from various factors to produce personalized text (e.g., subtitles, captions) to be delivered to a user, simultaneously to the delivery of visual content, to the user, via a graphical user interface (GUI) of a computing device. Although providing comprehensive textual content to substitute for unavailable audio (based on personal or environmental factors) in media delivery is a known challenge, aspects of some embodiments of the present invention provide benefits over existing approaches to this challenge. These aspects not only distinguish embodiments of the present invention over existing solutions as being more efficient, effective, and/or comprehensive, these aspects of some embodiments of the present invention are also inextricably tied to computing. For example, in embodiments of the present invention, the one or more programs identify and process both structured and unstructured data (from a variety of data sources) to provide a multi-factor cognitive analytics to aid in the definition of components of a user profile. The diversity of the data sources and the ability of the one or more programs to synthesize a variety of data enables the one or more programs to factor information into the analysis, including temporal data, which is synthesized, in real-time, in order to realize the impacts of the data in a manner that informs the user profile and the text generated. The temporal data included by the one or more programs in the cognitive analytics may include, but are not limited to contemporaneous social media posts, viewing preferences, locations, etc. Based on the multi-factor analysis, in some embodiments of the present invention, the one or more programs provide personalized text.

Aspects of embodiments of the present invention are inextricably linked to community based on the temporal requirements of the method. From the perspective of the user, when the user views media on a device, the customized content generated by the program code must be synchronized with the content of the media. Without this synchronization, the user cannot appreciate the customized content during his or her viewing experience. Thus, in embodiments of the present invention, the program works to create a seemingly instantaneous customized supplement to content selected and viewed by a user.

Unlike existing approaches to textual representation of audio content, embodiments of the present invention are not merely speech and sound recognition and interpretation programs, but rather, embodiments of the present invention optimize textual expressions of audio content in media for an individual and/or group of consumers, based on generating a data model that correlates factors, including factors experienced in the environment, with discoverable personal parameters, including but not limited to, vocabulary, language, culture, age, religion, and/or somatic state of the user. Thus, embodiments of the present invention approach generating (or updating) textual content from a consumer-based perspective. In personalizing the approach to textual content generation, in some embodiments of the present invention, the one or more programs analyze unstructured data, including but not limited to, personal (or group) data available on social media, including pictures of the individual and/or group (e.g., as related to personal attributes of the user). The one or more programs reference the data model when generating personalized textual content.

Embodiments of the present invention are inextricably tied to computing at least because the interconnectivity of distributed systems and data mining and processing techniques to access, analyze, and apply data from multiple sources, both structured and unstructured, is achievable only through the utilization of computing systems. The utilization of computing technologies enables the multi-factor cognitive analysis in embodiments of the present invention that result in the generation of textual content that is both customized, as well as timely. As discussed herein, program code in embodiments of the present invention can utilize recent data to adapt textual content, such as subtitles, to temporal personal conditions, including but not limited to, the mood of a viewer.

Certain embodiments of the present invention may provide significant improvements to hardware devices, such as smart televisions. For example, FIG. 4, which will be discussed later, internalizes certain of these aspects and expands the functionality of the technology in a secure manner. For example, aspects of the present invention may be locally implemented to avoid potential security issues. Performance of the embodiment of FIG. 4, because of the localization of the functionality, is in keeping with existing smart televisions and televisions because the one or more programs can utilize local data for a select group of people (which will be discussed later) to customize textual content displayed.

As will be understood by one of skill in the art, embodiments of the present invention have practical applications in a variety of environments. The need for text to supplement and/or complement audio content in media is experienced in many different situations. However, for ease of understanding, certain specific and non-limiting examples are discussed below to illustrate the utility of embodiments of the present invention. For example, embodiments of the present invention can be utilized to improve the experience of watching a video on a personal device in a loud environment, the experience of watching a movie with subtitles, and the experience of participating in an online course.

In the first example, when a user utilizes a personal device to watch video content in an environment that is not conducive to comprehending the audio, the individual will rely on subtitles, but the subtitles are generally a textual representation of the spoken language or a translation of the spoken language, verbatim. A general translation or dictation could be misconstrued by a given viewer based on personal attributes of the user, including but not limited to: age, cultural norms, principles, dialect, and values. As a result of one or more personal attributes, the user may not derive maximum benefit (from a comprehension and/or entertainment standpoint) from the content, possibly leading to confusion and eliciting from the viewer, an unintended (by the content provider) response.

In the second example, a user who relies on general subtitles and captions may not derive the experience from a movie that he or she would otherwise. Different viewers, based on different personal attributes (e.g., mood, experience, culture, age, physical health, lexicon, and/or health), may react differently to the combined audio and visual experience of a movie, and may interpret the content differently. By substituting the audio with a singular representation in text, the individual experiences of the viewers could be stymied, as, arguably, a straight audio-text textual representation may effectively flatten the content, i.e., viewers see the same subtitle or narration without any personal contextual input. In a basic example, the subtitles may not appear in a native language of the viewer. Also, if the subtitles are a translation, the words chosen in the translation may not be appropriate or the best choice, based on one or more of the culture, age, mood, dialect, and/or values of the viewer.

In the third example, as online courses become available across different countries, the differences in how sentiments are phrased can be a challenge when converting audio to text. For example, the instruction "go forward" to an individual paging through a book, may mean paging to either the left or the right, depending on the native language of the participant. Thus, customized directions that take into account the direction of the preferred language of the user would be useful in expressing the intended directions to that user.

In each of the above three examples, the generation of customized content by one or more programs in embodiments of the present invention provides a more comprehensive and arguably, enjoyable, viewer experience. Benefits of embodiments of the present invention include, but are not limited to: 1) the generation (by the program code) of enhanced text that varies not only from user to user, but also, temporally, for the same user; 2) the flexibility of the customized enhanced text increases the availability of content to a wider audience; 3) the flexibility of the customized enhanced text increases each user's comprehension of content in media; 4) the integration of personalized attributes into the generation of the content reduces potential for misinterpretation of the content of the media; and 5) the integration of personalized attributes into the generation of the content reduces the potential for the content to impact viewers negatively (e.g., when the user possesses certain personal attributes that may create sensitivities to certain content, if expressed without sensitivity to these attributes).

FIG. 1 is a technical environment 100 into which aspects of some embodiments of the present invention may be implemented. This technical environment 100 is a non-limiting example of an environment into which aspects of embodiments of the present invention may be implemented. As will be illustrated in the context of FIG. 1, in embodiments of the present invention, one or more programs perform a cognitive factor analysis to generate or augment textual representations of audio in media observed by a view through a user interface 110. The program code generates the content and displays the content in the user interface 110 at a speed that enables the viewer to view the text contemporaneously with the audio that the viewer is unable, for personal and/or environmental reasons, to receive/comprehend. The user interface 110 may be rendered by a personal computing device 115 that is paired with one or more Internet of Things (IoT) devices 120.

As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device 115) can identify the source of the information. Within the IoT, various devices can communicate with each other and can access data from sources available over various communication networks, including the Internet.

In addition to viewing media through the user interface 110, displayed/rendered on the personal computing device 115, by program code, executed by a processor internal to the device and/or communicatively coupled to the device over a network (e.g., Internet) connection, the user/viewer may utilize the personal computing device 115 to interact with various computing resources, including the aforementioned IoT devices 120 and social media platforms 125. In some embodiments of the present invention, the user may select and view media through the user interface 110 as well as transmit and receive data from additional computing resources through the user interface 110.

Based on the connectivity of the personal computing device 115 to the additional computing resources and/or direct connectivity of a computer resource executing the program code to the additional computing resources, program code in embodiments of the present invention may access these additional computing resources (e.g., IoT devices 120 and social media platforms 125) to gather personal information about the user. The program code will utilize this information to customize displayed textual content. For example, the viewer may utilize a personal computing device 115 to connect to external computing resources (e.g., IoT devices 120 and social media platforms 125) to manage user profiles, configure social media accounts, define preferences, obtain biometrics and other health measurements, etc. The program code in embodiments of the present invention may intercept or observe these communications and/or may take advantage of the connectivity of the personal computing device 115 to these external resources. Based on this connectivity, the program code may obtain data for a user profile that the program code can store and maintain (e.g., update, based on temporal variations in personal data), in a centralized data store, and/or in a local data store on the user's personal computing device 115.

In some embodiments of the present invention, the program code maintains user profiles in a user database 130. As discussed herein, program code in an embodiment of the present invention constructs and maintains a user profile by accessing and analyzing data from one or more computing resources 135, potentially across multiple domains. Data in a user profile may include, but is not limited to, the likes, dislikes, culture, lexicon and all other personal user properties of the user.

In embodiments of the present invention, program code executed by at least one processing resources identifies and obtains personal user data from external computing resources, including but not limited to, IoT devices 120 and social media platforms 125. As aforementioned, the inter-connectivity of computing resources in the distributed computing environment 100 enables the program code to access data across a variety of systems and platforms and utilize this data to generate timely customized textual content, to accompany visual media, viewed by a user, in the user interface 110, displayed/rendered on the personal computing device 115. The program code requests, obtains, and stores personal user data from the external computing resources.

In some embodiments of the present invention, program code that monitors, collects, and interprets attributes utilized to customize textual content can be understood as a user profile maintenance module. This module may reside on one or more of the personal computing device 115, or a shared computing resource, including but not limited to a resource communicatively coupled to, or hosting, the user database 130. The user database 130 retains the user profiles. In some embodiments of the present invention, the program code (e.g., the user profile maintenance module), monitors and learns from social media inputs made on the personal computing device 115 (e.g., when a user utilizes the personal computing device 115 to configure attributes of a social media account on a social media platforms 125). The user profile for the present invention is effectively linked by this program code to social media accounts on social media platforms 125 and can therefore reflect, in real time, changes to the social media profile that affect generation of customized textual content. By monitoring changes to a social media profile, the program code may extract insights about the user regarding emotional state, lexicon, etc. Similarly, the program code (e.g., the user profile maintenance module) can monitor and extract insight from a user's utilization of the personal computing device 115 to interact with IoT devices 120, such as personal sensors. By monitoring input through the personal computing device 115 to various personal IoT devices 120, the program code can amass data related to a user's Smart Watch, Smart home system, Google glass, health monitoring system, fitness tracker, etc. The program code utilizes this data to update aspects of the user's profile. Because certain of the data is temporal in nature, by linking the user profile to the personal sensor data of the user, the user profile can be consistently updated by the program code to reflect current and accurate data. For example, the program code may access a user's health tracking device to extract health status, over time, and a change in this condition may necessitate a change in customized textual presentation.

In some embodiments of the present invention, in order to obtain timely personal data without impacting the processing efficiency of the computing resourcing of the technical environment 100, the program code obtains data from one or more external computing resources at pre-defined intervals. The program code may utilize the connectivity of the personal computing device 115 to the external computing resources to crawl these connections at defined intervals or times. As discussed above, the program code obtains both structured and unstructured data and the data obtained from various resources may be in differing formats. Thus, in some embodiments of the present invention, the program code processes the data in order to standardize it for utilization in the user profile. Depending on the data source, the program code may utilize different methods, processes, and/or algorithms to standardize the data. In some embodiments of the present invention, the program code utilizes natural language processing algorithms and/or cognitive analytics to identify not only user preferences and attributes, but also, to identify a current emotional state or mood of the user (e.g., happy, sad, angry, etc.). In some embodiments of the present invention, the program code may select an emotional state from a pre-defined finite list of possibilities. The program code may also utilize this analysis to determine a lexicon of the user. The program code may apply various analytical tools to data obtained by the program code from the IoT devices 120. In some embodiments of the present invention, the program code consolidates identified attributes into distinct components that trigger specific changes to textual content.

Thus, as explained above, in some embodiments of the present invention, once the program code obtains personalized data, including attributes, from the computing resources communicatively coupled to the personal computing device 115 (e.g., IoT devices 120 and social media platforms 125) the program code utilizes the data to build a user profile, which the program code stores in a user database 130. In various embodiments of the present invention, the program code utilizes the user database 130 to store the user's profile, preferences, and additional data (e.g., insights), generated by the program code, as it maintains the user profile.

In some embodiments of the present invention, program code that generates customized textual content and/or augments existing content with customized textual content is executed on one or more computing resources 135 in the distributed computing environment 100, which may include the personal computing device 115. The one or more computing resources 135 are communicatively coupled to the user database 130. The program code obtains personal user information (i.e., the user profile from the user database 130) and transforms subtitle text or caption text into customized (personalized) content for the user. The program code displays the customized content in a user interface 110 on the personalized computing device 115 of the user. Thus, the one or more program have changed a display (e.g., standard subtitles), in real-time, to display the augmented/customized content in place of or in addition to the standard subtitles. The program code times implementing the augmented/customized content in the user interface 110 to synchronize with the video content, as is the custom with subtitles.

In order to generate and display the generated customized content, when a user is watching a video or listening to audio utilizing the personal computing device 115, in a user interface 110 generated by program code, the program code obtains data comprising an audio portion of the media (e.g., the audio of the spoken words). The program code may obtain a textual representation of the audio portion and/or may utilize a dictation or natural language processing system to convert audio content to text. Because the audio content of the media may be streamed or received/played progressively by the personal computing device 115, in embodiments of the present invention, the program code may convert standard text to customized text on a progressive basis as well.

In some embodiments of the present invention, a first augmentation of the text involves the program code determining whether the standard textual content is in the preferred language of the user. The program code accesses the user profile of the user to determine whether the language of the textual representation is a preferred language of the user. If the language of the textual representation is not compatible with the language preferences of the user, the program code utilizes a translation program (e.g., a translation application programming interface (API)) to convert the textual representation to a preferred language of the user.

In order to determine where changes should be made to the textual representation, based on the user profile of the user, the program code performs a cognitive natural language analysis of the textual representation, to determine a context for the textual representation. The program mat perform this cognitive analysis after converting the textual representation to the preferred language of the user. In some embodiments of the present invention, the program code may employ a cognitive natural language processor 140 in performing a cognitive analysis of text.

In order to analyze the text for augmentation/customization by the program code, the cognitive natural language processor 140 may include various APIs that process the text either consecutively or in parallel, in order to enhance the text such that it is customized to the user. The various APIs may include, but are not limited to, a tone analyzer API, a personality insight API, a text to speech API, and a translation API. The text to speech API may be utilized by the program code to convert enhanced text that resulted from augmenting audio back into audio, but this time, a customized audio. The translation API may be utilized by the program code to convert the original text (derived from audio) to text in a preferred language of the user, as indicated in the user profile of the user in the user database 130. For a given user, the program code of the cognitive natural language processor 140 accesses the user profile in the user database 130 and utilizes that data therein to transform text derived from audio in media to appropriate/personalized content for the user.

The cognitive natural language processor 140 and the processing capabilities of the program code tied to this one or more resource are implemented as one or more of a deterministic system and/or a machine learning system. When implemented in a deterministic system, program code executed by one or more processors detects the input (i.e., original) language and the desired language output by checking user profile to find a language preference of the user. If the program code determines that the text should be translated, the program code calls a translation API to translate the text. The program code also obtains, from the user profile on the user database 130, the current personal settings of the user, and utilizes these settings (preferences) to augment the text, ultimately resulting in the program code displaying customized subtitles in the user interface 110.

An example of a personal setting that would generate a change in original text is if the user profile indicates that the user is adverse to colorful language. The program code may substitute less colorful wording when augmenting the text. In general, based on various traits of the user (age, personal philosophy, health (as indicated by IoT sensors), lexicon, etc.), the program code identifies words in the text that should be substituted for more effective words. For example, if the user profile of an individual indicates that the person is American, the word "queue" may be substituted by the program code for the word "line." The program code may utilize a thesaurus or other electronic library resource in order to provide wording substitutions. In some embodiments of the present invention, the user database 130 may include mappings from various elements of a user profile to pre-defined substitutions to be made in the original text, based on the program code locating those elements in a given user's profile.

In some embodiments of the present invention, a cognitive natural language processor 140 and the processing capabilities of the program code tied to this one or more resource are implemented as a machine learning system that includes a neural network (NN). In certain embodiments of the present invention the program code utilizes supervised, semi-supervised, or unsupervised deep learning through a single- or multi-layer NN to correlate various attributes from unstructured and structured data related to a user (e.g., gathered by the program code from IoT devices 120 and social media platforms 125) with specific changes to implement in converted-to-text audio content to customize the text for display in a user interface 110 of the user's personal computing device 115. The program code utilizes resources of the NN to identify and weight connections from the attribute sets in user profiles to classify user attributes as multiple elements that indicate specific changes should be implemented in the text to customize the text for the user. Based on these classifications/elements, the program code implements the specific changes to the text.

As understood by one of skill in the art, neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situation where data sets are multiple and expansive, including across the distributed network of the technical environment 100. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Thus, by utilizing an NN the program code can identify attributes and classify these attributes into elements of user profiles.

In some embodiments of the present invention, to meet the performance demands of the system, in parallel with performing the cognitive analysis of the textual representation, the program code modifies and enhances the text in the textual representation (e.g., altering words), and displays the enhanced (customized) text in the user interface 110 (e.g., synchronized with visual content). In some embodiments of the present invention, the program code displays the enhanced text as subtitles to the visual portion of the media rendered in the user interface 110. In some embodiments of the present invention, the program code renders the text as scrolling text or converts the enhanced text to audio content, playing the audio in the user interface 110.

Figure 2:
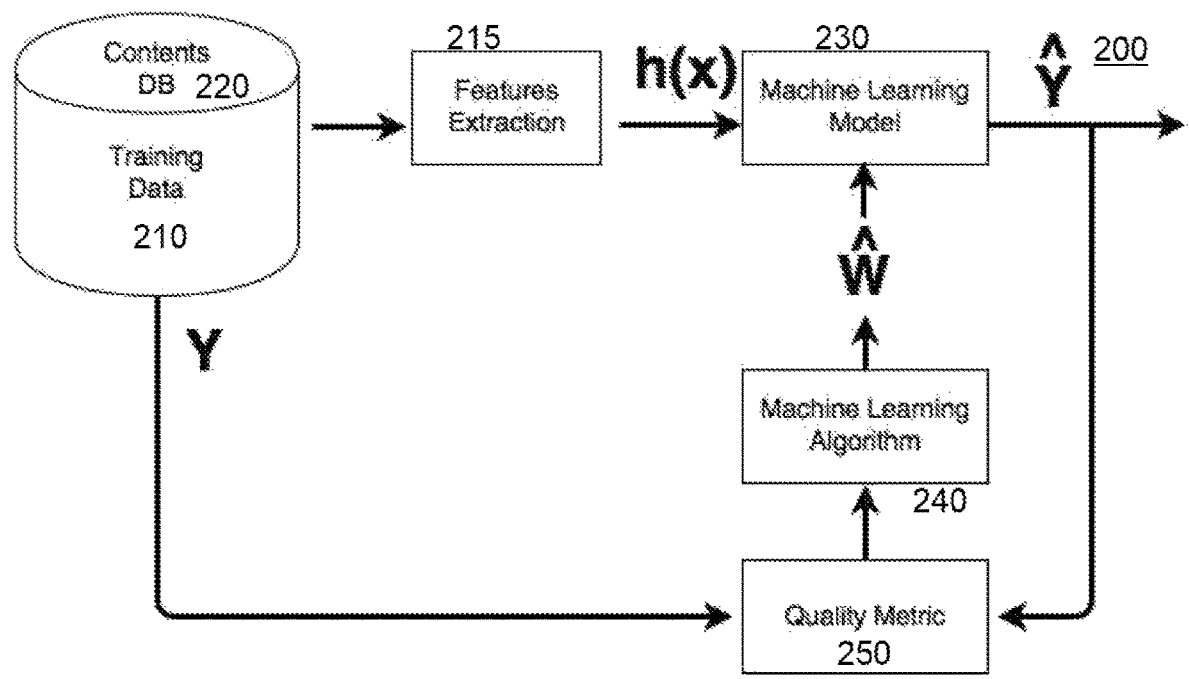
FIG. 2 is an illustration of certain aspects of an embodiment of the present invention.

FIG. 2 is an example of a machine learning training system 200 that can be utilized to a perform cognitive analysis in embodiments of the present invention. Machine learning (ML) solves problems that cannot be solved by numerical means alone. In this ML-based example, program code extracts various features/attributes (215) from training data 210, which may be resident in one or more databases 220. The features are utilized to develop a predictor function, h(x), also referred to as a hypothesis, which the program code utilizes as a machine learning model 230. In identifying various features/attributes in the training data 210, the program code may utilize various techniques including, but not limited to, mutual information, which is an example of a method that can be utilized to identify features in an embodiment of the present invention. Further embodiments of the present invention utilize varying techniques to select features, including but not limited to, principal component analysis, diffusion mapping, a Random Forest, and/or recursive feature elimination (a brute force approach to selecting features), to select the features. "Y" is the conclusion (e.g., element) that can be reached (e.g., a mood, lexicon, age, etc. for a user), which when identified in the profile of a user would trigger the program code to make a given discrete change to the text. The program code may utilize a machine learning algorithm 240 to train the machine learning model 230, including providing weights for the conclusions, so that the program code can prioritize various changes located based on the predictor functions that comprise the machine learning model 230. The conclusions can be evaluated by a quality metric 250.

By selecting a diverse set of training data 210, the program code trains the machine learning model 230 to identify and weight various attributes of users, including but not limited to, users with a variety of lexicons, cultures, age, religions, and/or somatic states. To utilize the NN to augment a subtitle, the program code obtains (or derives) the original subtitle and values from the user profile to generate an array of values that to input into input neurons of the NN. Responsive to these inputs, the output neurons of the NN produce an array that includes the augmented version of the text (e.g., subtitles). The program code displays the augmented version in the user interface 110, contemporaneously with the visual content of the original media.

In some embodiments of the present invention, the machine learning training system 200 that can be utilized to perform a cognitive analysis in embodiments of the present invention may include a trained neuromorphic chip, specifically, or a neuromorphic processor, generally. Returning to FIG. 1, the neuromorphic processor or trained neuromorphic chip can be incorporated into the personal computing device 115 and/or one or more computing resources 135, and may be included in the cognitive natural language processor 140. One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million (2^28). Memory, computation, and communication are handled in each of the 4096 neurosynaptic cores, so TrueNorth circumvents the von-Neumann-architecture bottlenecks and is very energy-efficient.

In an embodiment of the present invention, the neuromorphic chip or processor, incorporated or associated with the personal computing device 115, receives or derives (from audio), a textual representation of media content, identifies the user of the personal computing device 115 and accesses the user profile of the user in the user database 130, and provides pattern analysis of the user profile to identify a set of attributes that represent distinct changes to implement in the textual representation. The program code then implements the changes in the textual representation, based on the feature identifications by the neuromorphic chip or processor.

As discussed above, in embodiments of the present invention, the program code utilizes machine learning APIs in order to generate the attributes upon which a customization of the textual content may be based. In embodiments of the present invention, certain of the APIs may be part of a known cognitive agent, such as the IBM Watson® Application Program Interface (API), a product of International Business Machines Corporation. IBM Watson® is a registered trademark of International Business Machines Corporation, Armonk, N.Y., US. In some embodiments of the present invention, APIs utilized by the one or more programs may include, but are not limited to, Retrieve and Rank (i.e., a service available through the IBM Watson® Developer Cloud that can surface the most relevant information from a collection of documents), concepts/visual insights, trade off analytics, document conversion, and/or relationship extraction.

Watson's cognitive computing may additionally be utilized by program code in embodiments of the present invention to generate textual content by providing voice recognition, machine translation, text to speech, and other semantic tools that enable custom subtitling of the media, in many languages. The tools utilized to generate textual content may include the IBM Watson® Speech to Text API endpoint. Program code in some embodiments of the present invention process media (videos) through the IBM® Cloud Video Platform, to produce an associated audio. The program code generates automated subtitles (the non-customized textual content) by applying a speech to text service to the audio. The program code augments these automated subtitles to generate the customized textual content for display in the user interface 110.

Figure 3:
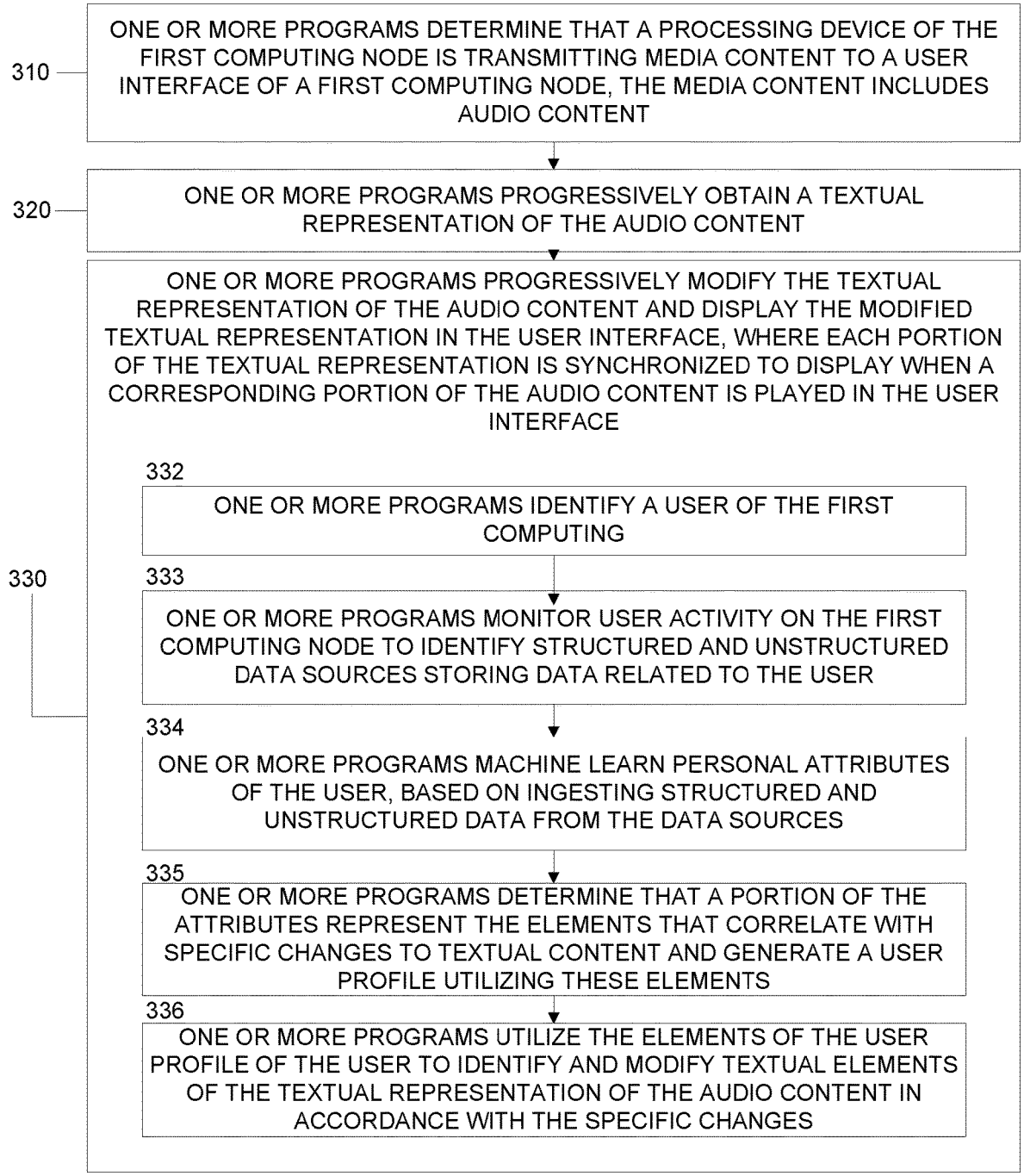
FIG. 3 is a workflow illustrating certain aspects of an embodiment of the present invention.

FIG. 3 is a workflow 300 that illustrates certain aspects of some embodiments of the present invention. In some embodiments of the present invention, one or more programs executed by one or more processors determine that a processing device of the first computing node is transmitting media content to a user interface of a first computing node, the media content includes audio content (310). The one or more programs progressively obtain a textual representation of the audio content (320). The one or more programs progressively modify the textual representation of the audio content and display the modified textual representation in the user interface, where each portion of the textual representation is synchronized to display when a corresponding portion of the audio content is played in the user interface (330).

In some embodiments of the present invention, the progressively modifying includes utilizing elements of a user profile to identify and modify textual elements of the textual representation of the audio content (338). In order to utilize the user profile, the one or more programs identify a user of the first computing node (332) and generate a user profile. To generate a user profile, the one or more programs monitor user activity on the first computing node to identify structured and unstructured data sources storing data related to the user (333). The one or more programs machine learn personal attributes of the user, based on ingesting structured and unstructured data from the data sources (334). The one or more programs determine that a portion of the attributes represent the elements that correlate with specific changes to textual content and generate a user profile utilizing these elements (335). The one or more programs utilize the elements of the user profile of the user to identify and modify textual elements of the textual representation of the audio content in accordance with the specific changes (336).

Figure 4:
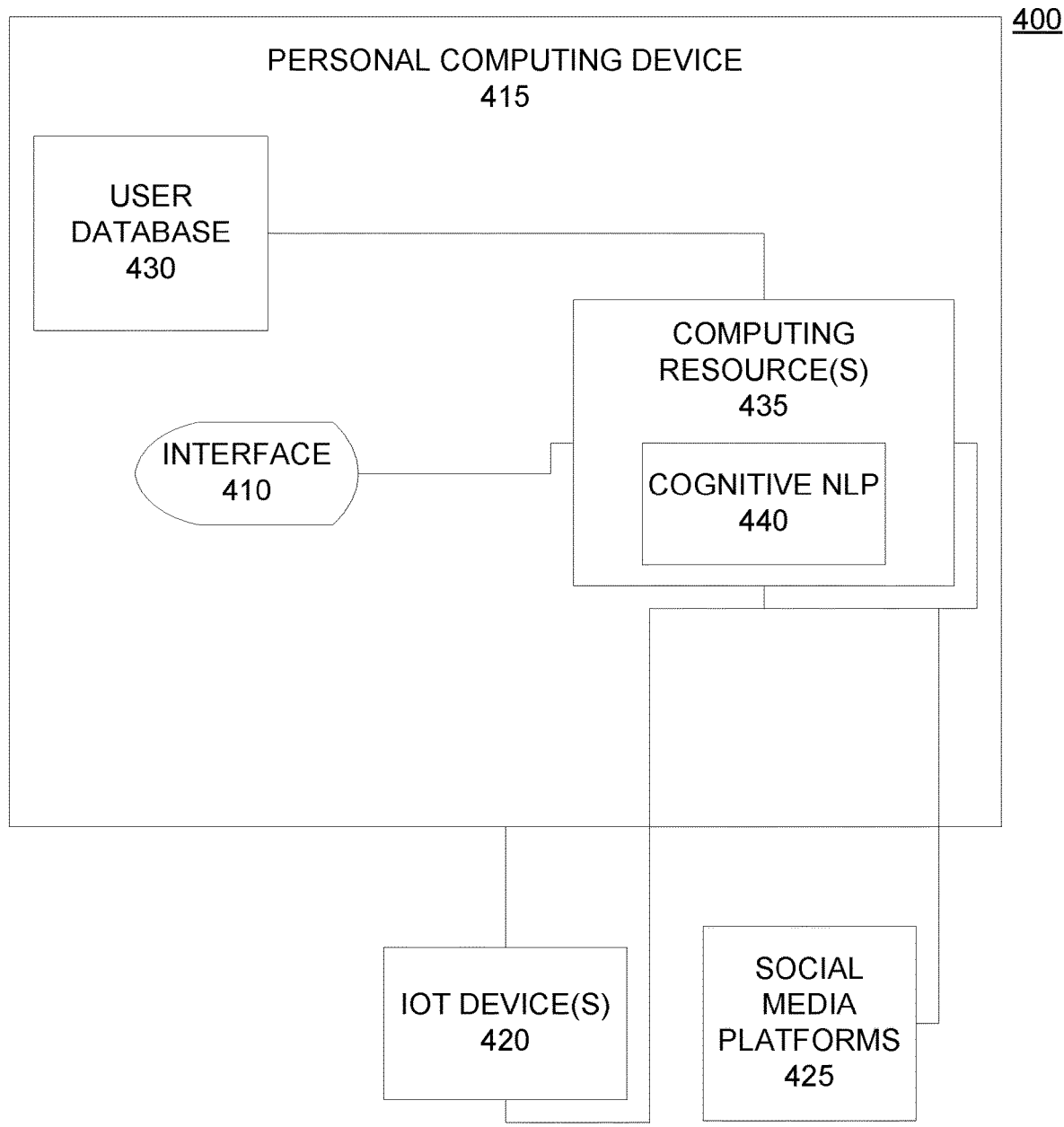
FIG. 4 is an illustration of various aspects of an environment in which aspects of embodiments of the present invention may be implemented.

In some embodiments of the present invention, various components of the system are internal components to a smart television or other device capable of displaying video. This system configuration affords certain privacy protections and performance advantages. FIG. 4 is an example of an embodiment of the present invention 400 where many aspects are internal to a computing device 415, which may be any device that can be utilized to view video content (e.g., smart television, mobile computing device). In this embodiment 400, the cognitive processing described above that customizes text, such as subtitles on the user interface 410, accesses IoT devices 420 and social media platforms 425, on computing resources that are external to the computing device 415 to generate and update a user profile in the user database 430, which is a resource that is internal to the computing device 415, rather than a shared resource, for increased security. In some embodiments of the present invention, the user database 430 retains only the user profiles of individuals who are resident in a physical setting where the computing device 415 is utilized. The computing resource(s) 435 and cognitive NLP 440 is also handled by internal resources of the computing device 415, which may result in faster performance of customized content generation, increasing the efficiency of the custom content generation.

The cognitive analysis performed in embodiments of the present invention in order to generate customized subtitles or other text is performed at different speeds depending on the type of data utilized for the cognitive analysis. For example, certain elements of a user profile, once discovered, may remain fairly static, such as the preferred language of an individual. For example, if an individual accesses content where the audio is in a language that based on the user profile, the individual cannot comprehend, one or more programs in an embodiment of the present invention, can provide substitute content in a preferred language. However, certain changes to customize the content may be realized by components of the system over time. For example, a conservative viewer (determined by the one or more programs based on age, preferences, browser search history, political leanings, ad targeting on social media, posts on social media, heart rate, etc.), may be viewing subtitles in a preferred language. During the viewing, the one or more programs receives data from an IoT device utilized by the individual indicating an increased heart rate. The one or more programs monitor the heart rate of the individual for a pre-determined period of time (hour, ten minutes, etc.) and determine that the rise in heart rate is consistent and that no other sensor (e.g., personal fitness device) indicates a physical change that would elevate the heart rate of the individual. The one or more programs customizes the text on the display to utilize more conservative terms in the language. The one or more programs continue to monitor the IoT device and determine that the heart rate of the individual has returned to an expected heart rate, after the change in the content. If the heart rate has not returned to an expected heart rate, the one or more programs may reference various devices associated with the individual and the user profile to determine whether further changes should be made to the textual representations of the content and to apply those changes. In general, when the one or more programs recognize a negative trend, the one or more programs attempt to mitigate the trend.

In order to provide the most representative and cohesive user profile, the one or more programs may refresh various portions of the user profile at regular intervals, which may differ depending on the data source. For example, the one or more programs may take hourly reading of a fitness tracker but may only check browser search history every other day. In some embodiments of the present invention, the user profile is separated into more static and more dynamic information. In updating the user profile, the program code utilizes the classifications of the data in order to determine how often to refresh the data by connecting to the data's source.

As understood by one of skill in the art, the rapidity with which the program code can customize text may depend on the type of data prioritized and/or available in the implementation of aspects of the present invention. For example, while an airline may utilize aspects of the embodiments that focus on biometric monitoring, embodiments of the present invention implemented in a home may focus on data analyzed in social media postings.

Returning to FIG. 4, when aspects of the present embodiment are implemented on a computing device 415 that is a smart television in an environment where a number of individuals are present, one or more programs in an embodiment of the present invention may customize textual content by aggregating the data of the individuals in the shared environment. For example, the computing resource(s) 435 in the computing device 415 may identify a group of individuals in the room. The one or more programs may build and/or access user profiles for the individuals and provide customized textual content in the interface 410 based on an aggregate of the values. If the composition of the group changes (as indicated by data obtained by the one or more programs from IoT devices 420, sensors, etc.) the one or more programs may change the customization based on the new composition of the group. For example, if the content was adapted to utilize language appropriate for children and the one or more programs determine that children are no longer in the vicinity of the computing device 415, the one or more programs generates customized textual content that is not specifically geared, based on the vocabulary, to children.

Embodiments of the present invention include a computer-implemented method, a computer program product, and a computer system where one or more programs executing on one or more processors determine that a processing device of the first computing node is transmitting media content to a user interface of the first computing node, where the media content includes audio content. The one or more programs progressively obtain, contemporaneous with the transmitting, a textual representation of the audio content. The one or more programs progressively modify the textual representation of the audio content, where the progressively modifying includes: the one or more programs identifying a user of the first computing device; based on the identifying, the one or more programs generating a user profile for the user, the generating comprising: one or more programs monitoring user activity on the first computing node to identify structured and unstructured data sources storing data related to the user, where the activity on the first computing node comprises connecting to the structured and unstructured data sources; the one or more programs machine learning personal attributes of the user, based on ingesting structured data and unstructured data from the data sources; the one or more programs determining that a portion of the attributes represent elements that correlate with specific changes to textual content; and the one or more programs generating the user profile comprising the elements; and the one or more programs utilizing the elements of the user profile of the user of the first computing node to identify and modify textual elements of the textual representation of the audio content in accordance with the specific changes. The one or more programs rendering the modified textual representation in the user interface, where each portion of the textual representation is synchronized to render when a corresponding portion of the audio content is played in the user interface.

In some embodiments of the present invention, the one or more programs progressively obtain the textual representation of the audio content by: obtaining the audio content; and converting the audio content to one or more text files utilizing an audio to text application programming interface.

In some embodiments of the present invention, the one or more programs generating the user profile for the user, further includes: the one or more programs retaining the user profile in a centralized data resource; the one or more programs continuously monitoring user activity on the first computing node to determine when a change is made to the data; the one or more programs ingesting a portion of the data comprises the change; the one or more programs machine learning updated personal attributes of the user, based on ingesting the portion of the data; and the one or more programs determining that a portion of the updated personal attributes represent changes to the elements that correlate with the specific changes to the textual content; and the one or more programs updating the elements, based on the updated personal attributes.

In some embodiments of the present invention, the one or more programs determine that the processing device of the first computing node is transmitting new media content to the user interface of the first computing node, wherein the new media content includes new audio content. The one or more programs progressively obtain, contemporaneous with the transmitting, a textual representation of the new audio content. The one or more programs progressively modify the textual representation of the new audio content, where the progressively modifying includes: the one or more programs accessing the user profile of the user of the first computing node; and the one or more programs utilizing the elements of the user profile of the user of the first computing node to identify and modify textual elements of the textual representation of the new audio content in accordance with the specific changes; and the one or more programs rendering the modified textual representation of the new audio content in the user interface, where each portion of the textual representation of the new audio content is synchronized to render when a corresponding portion of the new audio content is played in the user interface.

In some embodiments of the present invention, an element of the elements of the user profile includes a preferred language of the user element, where a corresponding specific change of the specific changes to the preferred language of the user element includes the one or more programs translating the textual elements from a current language into the preferred language of the user, and where the one or more programs utilizing the elements of the user profile of the user of the first computing node to identify and modify textual elements of the textual representation of the audio content in accordance with the specific changes includes the one or more programs translating the textual representation from the original language to the preferred language of the user.

In some embodiments of the present invention, an element of the elements of the user profile includes an age of the user element, where a corresponding specific change of the specific changes to the age of the user element includes the one or more programs omitting pre-defined words based on the age of the user, and where the one or more programs utilizing the elements of the user profile of the user of the first computing node to identify and modify textual elements of the textual representation of the audio content in accordance with the specific changes includes: the one or more programs identifying certain of the pre-defined words in the textual representation; the one or more programs determining if the age of the user is below a given threshold; and based on the age of the user being below the given threshold, the one or more programs modifying the textual representation to omit the certain of the pre-defined words.

In some embodiments of the present invention, an element of the elements of the user profile comprises a lexicon of the user element, where a corresponding specific change of the specific changes to the lexicon of the user element includes the one or more programs substituting words in the textual elements that are unknown in the lexicon for words common in the lexicon, and where the one or more programs utilizing the elements of the user profile of the user of the first computing node to identify and modify textual elements of the textual representation of the audio content in accordance with the specific changes, includes the one or more programs modifying the textual representation to substitute the words in the textual elements that are unknown in the lexicon of the user for the words common in the lexicon.

In some embodiments of the present invention, the one or more programs training machine learning algorithms utilized in the machine learning with training data. This training may include the one or more programs inputting, into the machine learning algorithms, one or more training data sets representing various elements comprising various user profiles; and the one or more programs inputting, into the machine learning algorithm, corresponding changes the textual content related to each element of the various elements.

In some embodiments of the present invention, the modified textual representation is one or more of: subtitle text and/or caption definitions.

In some embodiments of the present invention, the one or more programs rendering the modified textual content includes: the one or more programs displaying the modified textual content in the user interface at a location on a display of the first computing node utilized for subtitle text. The one or more programs rendering the modified textual content may include: the one or more programs converting the modified text to customized audio; and the one or more programs playing the customized audio utilizing an audio player of the user interface. The one or more programs rendering the modified textual content may include: the one or more programs displaying the modified textual content in the user interface as scrolling text.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the personal computing device 115 (FIG. 1), the Internet of Things (IoT) devices 120 (FIG. 1), the user database 130 (FIG. 1), and one or more computing resources 135 (FIG. 1) can each be understood as a cloud computing node 10 (FIG. 5) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
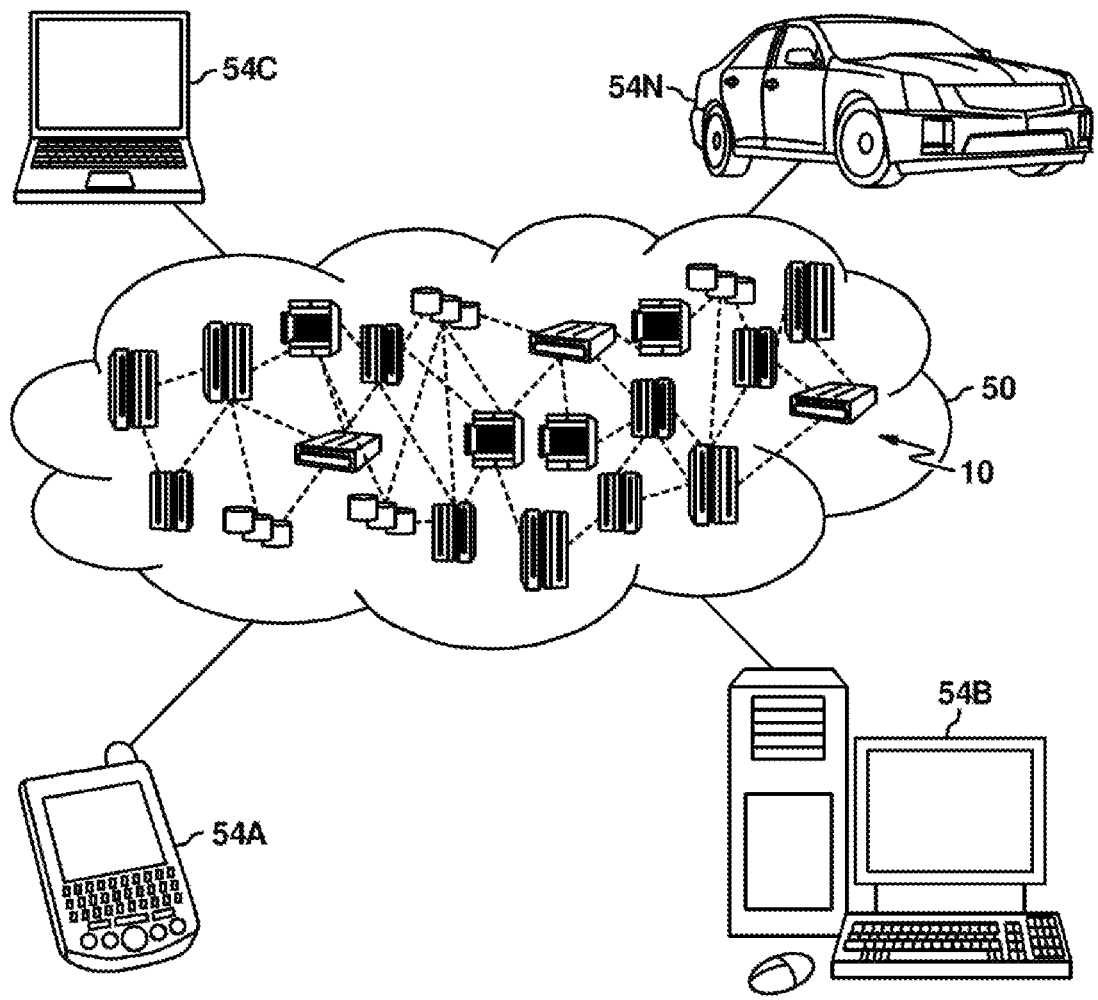
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
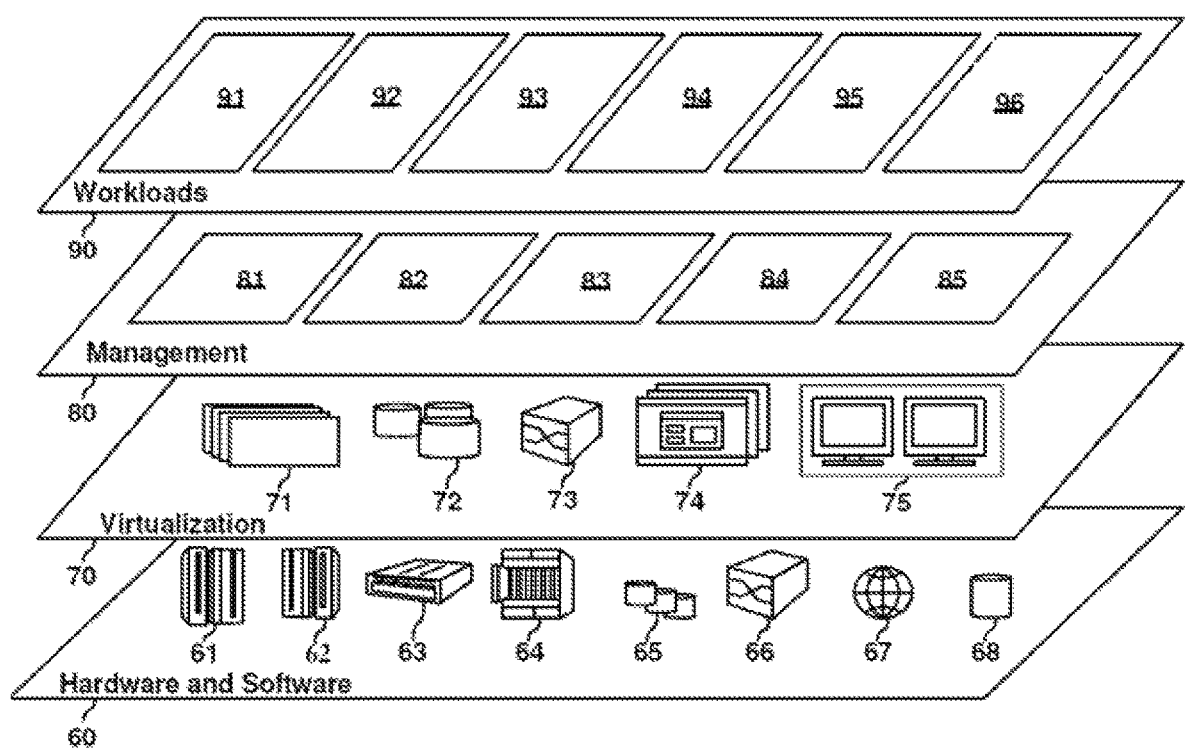
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing a cognitive multiple factor analysis to generate and display customized textual content for 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   determining, by one or more processors, that a processing device of the first computing node is transmitting media content to a user interface of the first computing node, wherein the media content includes audio content;
   progressively obtaining, by the one or more processors, contemporaneous with the transmitting, a textual representation of the audio content;
   progressively modifying and enhancing, by the one or more processors, the textual representation of the audio content, wherein the progressively modifying and enhancing comprises:
   identifying, by the one or more processors, a user of the first computing device;
   based on the identifying, generating, by the one or more processors, a user profile for the user, the generating comprising:
      monitoring, by the one or more processors, user activity on the first computing node to identify structured and unstructured data sources storing data related to the user, wherein the activity on the first computing node comprises connecting to the structured and unstructured data sources;
      machine learning, by the one or more processors, personal attributes of the user, based on ingesting structured data and unstructured data from the data sources;

determining, by the one or more processors, that a portion of the attributes represent elements that correlate with specific changes to textual content, wherein the elements comprise factors experienced by the user in an environment of the user and discoverable personal parameters describing the user; and generating, by the one or more processors, the user profile comprising the elements; and utilizing, by the one or more processors, the elements of the user profile of the user of the first computing node to identify and modify textual elements of the textual representation of the audio content in accordance with the specific changes, wherein the modified textual elements comprise alterations to words comprising the textual elements of the textual representation; and rendering, by the one or more processors, the modified textual representation in the user interface, wherein each portion of the modified textual representation is synchronized to render when a corresponding portion of the audio content is played in the user interface.

2. The computer-implemented method of claim 1, wherein progressively obtaining the textual representation of the audio content comprises:

obtaining, by the one or more processors, the audio content; and converting, by the one or more processors, the audio content to one or more text files utilizing an audio to text application programming interface.

3. The computer-implemented method of claim 1, wherein generating the user profile for the user, further comprises:

retaining, by the one or more processors, the user profile in a centralized data resource;

continuously monitoring, by the one or more processors, user activity on the first computing node to determine when a change is made to the data;

ingesting, by the one or more processors, a portion of the data comprises the change;

machine learning, by the one or more processors, updated personal attributes of the user, based on ingesting the portion of the data; and determining, by the one or more processors, that a portion of the updated personal attributes represent changes to the elements that correlate with the specific changes to the textual content; and updating, by the one or more processors, the elements, based on the updated personal attributes.

4. The computer-implemented method of claim 3, further comprising:

determining, by one or more processors, that the processing device of the first computing node is transmitting new media content to the user interface of the first computing node, wherein the new media content includes new audio content;

progressively obtaining, by the one or more processors, contemporaneous with the transmitting, a textual representation of the new audio content;

progressively modifying and enhancing, by the one or more processors, the textual representation of the new audio content, wherein the progressively modifying and enhancing comprises:

accessing, by the one or more processors, the user profile of the user of the first computing node; and utilizing, by the one or more processors, the elements of the user profile of the user of the first computing node to identify and modify textual elements of the textual representation of the new audio content in accordance with the specific changes, wherein the modified textual elements of the new audio content comprise alterations to words comprising the textual elements of the textual representation of the new audio content; and rendering, by the one or more processors, the modified textual representation of the new audio content in the user interface, wherein each portion of the modified textual representation of the new audio content is synchronized to render when a corresponding portion of the new audio content is played in the user interface.

5. The computer-implemented method of claim 1, wherein an element of the elements of the user profile comprises a preferred language of the user element, wherein a corresponding specific change of the specific changes to the preferred language of the user element comprises translating the textual elements from a current language into the preferred language of the user, and wherein utilizing the elements of the user profile of the user of the first computing node to identify and modify textual elements of the textual representation of the audio content in accordance with the specific changes comprises translating the textual representation from the original language to the preferred language of the user, and wherein the alterations to words comprise translations of the words.

6. The computer-implemented method of claim 1, wherein an element of the elements of the user profile comprises an age of the user element, wherein a corresponding specific change of the specific changes to the age of the user element comprises omitting pre-defined words based on the age of the user, and wherein utilizing the elements of the user profile of the user of the first computing node to identify and modify textual elements of the textual representation of the audio content in accordance with the specific changes comprises:

identifying, by the one or more processors, certain of the pre-defined words in the textual representation;

determining, by the one or more processors, if the age of the user is below a given threshold; and based on the age of the user being below the given threshold, modifying the textual representation to omit the certain of the pre-defined words.

7. The computer-implemented method of claim 1, wherein an element of the elements of the user profile comprises a lexicon of the user element, wherein a corresponding specific change of the specific changes to the lexicon of the user element comprises substituting words in the textual elements that are unknown in the lexicon for words common in the lexicon, and wherein utilizing the elements of the user profile of the user of the first computing node to identify and modify textual elements of the textual representation of the audio content in accordance with the specific changes comprises modifying the textual representation to substitute the words in the textual elements that are unknown in the lexicon of the user for the words common in the lexicon.

8. The computer-implemented method of claim 1, further comprising:

training, by one or more processors, machine learning algorithms utilized in the machine learning with training data.

9. The computer-implemented method of claim 8, the training further comprising:

inputting, by the one or more processors, into the machine learning algorithms, one or more training data sets representing various elements comprising various user profiles; and inputting, by the one or more processors, into the machine learning algorithm, corresponding changes the textual content related to each element of the various elements.

10. The computer-implemented method of claim 1, wherein the modified textual representation is selected from the group consisting of: subtitle text and caption definitions.

11. The computer-implemented method of claim 1, wherein rendering the modified textual content comprises:

displaying the modified textual content in the user interface at a location on a display of the first computing node utilized for subtitle text.

12. The computer-implemented method of claim 1, wherein rendering the modified textual content comprises:

converting, by the one or more processors, the modified text to customized audio; and playing, by the one or more processors, the customized audio utilizing an audio player of the user interface.

13. The computer-implemented method of claim 1, wherein rendering the modified textual content comprises:

displaying the modified textual content in the user interface as scrolling text.

14. A computer program product comprising:

a computer readable storage medium readable by one or more processors and storing instructions for execution by the one or more processors for performing a method comprising:

determining, by the one or more processors, that a processing device of the first computing node is transmitting media content to a user interface of the first computing node, wherein the media content includes audio content;

progressively obtaining, by the one or more processors, contemporaneous with the transmitting, a textual representation of the audio content;

progressively modifying and enhancing, by the one or more processors, the textual representation of the audio content, wherein the progressively modifying and enhancing comprises:

identifying, by the one or more processors, a user of the first computing device;

based on the identifying, generating, by the one or more processors, a user profile for the user, the generating comprising:

monitoring, by the one or more processors, user activity on the first computing node to identify structured and unstructured data sources storing data related to the user, wherein the activity on the first computing node comprises connecting to the structured and unstructured data sources;

machine learning, by the one or more processors, personal attributes of the user, based on ingesting structured data and unstructured data from the data sources;

determining, by the one or more processors, that a portion of the attributes represent elements that correlate with specific changes to textual content, wherein the elements comprise factors experienced by the user in an environment of the user and discoverable personal parameters describing the user and generating, by the one or more processors, the user profile comprising the elements; and utilizing, by the one or more processors, the elements of the user profile of the user of the first computing node to identify and modify textual elements of the textual representation of the audio content in accordance with the specific changes, wherein the modified textual elements comprise alterations to words comprising the textual elements of the textual representation; and rendering, by the one or more processors, the modified textual representation in the user interface, wherein each portion of the modified textual representation is synchronized to render when a corresponding portion of the audio content is played in the user interface.

15. The computer program product of claim 14, wherein progressively obtaining the textual representation of the audio content comprises:

obtaining, by the one or more processors, the audio content; and converting, by the one or more processors, the audio content to one or more text files utilizing an audio to text application programming interface.

16. The computer program product of claim 14, wherein generating the user profile for the user, further comprises:

retaining, by the one or more processors, the user profile in a centralized data resource;

continuously monitoring, by the one or more processors, user activity on the first computing node to determine when a change is made to the data;

ingesting, by the one or more processors, a portion of the data comprises the change;

machine learning, by the one or more processors, updated personal attributes of the user, based on ingesting the portion of the data; and determining, by the one or more processors, that a portion of the updated personal attributes represent changes to the elements that correlate with the specific changes to the textual content; and updating, by the one or more processors, the elements, based on the updated personal attributes.

17. The computer program product of claim 16, the method further comprising:

determining, by one or more processors, that the processing device of the first computing node is transmitting new media content to the user interface of the first computing node, wherein the new media content includes new audio content;

progressively obtaining, by the one or more processors, contemporaneous with the transmitting, a textual representation of the new audio content;

progressively modifying and enhancing, by the one or more processors, the textual representation of the new audio content, wherein the progressively modifying and enhancing comprises:

accessing, by the one or more processors, the user profile of the user of the first computing node; and utilizing, by the one or more processors, the elements of the user profile of the user of the first computing node to identify and modify textual elements of the textual representation of the new audio content in accordance with the specific changes, wherein the modified textual elements of the new audio content comprise alterations to words comprising the textual elements of the textual representation of the new audio content; and rendering, by the one or more processors, the modified textual representation of the new audio content in the user interface, wherein each portion of the modified textual representation of the new audio content is synchronized to render when a corresponding portion of the new audio content is played in the user interface.

18. The computer program product of claim 14, wherein an element of the elements of the user profile comprises a preferred language of the user element, wherein a corresponding specific change of the specific changes to the preferred language of the user element comprises translating the textual elements from a current language into the preferred language of the user, and wherein utilizing the elements of the user profile of the user of the first computing node to identify and modify textual elements of the textual representation of the audio content in accordance with the specific changes comprises translating the textual representation from the original language to the preferred language of the user.

19. The computer program product of claim 14, wherein an element of the elements of the user profile comprises an age of the user element, wherein a corresponding specific change of the specific changes to the age of the user element comprises omitting pre-defined words based on the age of the user, and wherein utilizing the elements of the user profile of the user of the first computing node to identify and modify textual elements of the textual representation of the audio content in accordance with the specific changes comprises:
    identifying, by the one or more processors, certain of the pre-defined words in the textual representation;
    determining, by the one or more processors, if the age of the user is below a given threshold; and
    based on the age of the user being below the given threshold, modifying the textual representation to omit the certain of the pre-defined words.

20. A system comprising:
    a memory;
    one or more processors in communication with the memory;
    program instructions executable by the one or more processors via the memory to perform a method, the method comprising:
        determining, by the one or more processors, that a processing device of the first computing node is transmitting media content to a user interface of the first computing node, wherein the media content includes audio content;
        progressively obtaining, by the one or more processors, contemporaneous with the transmitting, a textual representation of the audio content;
        progressively modifying and enhancing, by the one or more processors, the textual representation of the audio content, wherein the progressively modifying and enhancing comprises:
            identifying, by the one or more processors, a user of the first computing device;
            based on the identifying, generating, by the one or more processors, a user profile for the user, the generating comprising:
                monitoring, by the one or more processors, user activity on the first computing node to identify structured and unstructured data sources storing data related to the user, wherein the activity on the first computing node comprises connecting to the structured and unstructured data sources;
                machine learning, by the one or more processors, personal attributes of the user, based on ingesting structured data and unstructured data from the data sources;
                determining, by the one or more processors, that a portion of the attributes represent elements that correlate with specific changes to textual content, wherein the elements comprise factors experienced by the user in an environment of the user and discoverable personal parameters describing the user and
                generating, by the one or more processors, the user profile comprising the elements; and
            utilizing, by the one or more processors, the elements of the user profile of the user of the first computing node to identify and modify textual elements of the textual representation of the audio content in accordance with the specific changes, wherein the modified textual elements comprise alterations to words comprising the textual elements of the textual representation; and
        rendering, by the one or more processors, the modified textual representation in the user interface, wherein each portion of the modified textual representation is synchronized to render when a corresponding portion of the audio content is played in the user interface.

\* \* \* \* \*